United States Patent [19]
Short et al.

[11] Patent Number: 5,539,862
[45] Date of Patent: Jul. 23, 1996

[54] SYSTEM AND METHOD FOR THE DESIGN OF SOFTWARE SYSTEM USING A KNOWLEDGE BASE

[75] Inventors: Keith W. Short, Beaconsfield; Josephine O'Dwyer, Eton Wick, both of Great Britain; James R. Abbott, Plano, Tex.

[73] Assignee: Texas Instruments Incorporated, Dallas, Tex.

[21] Appl. No.: 986,657

[22] Filed: Dec. 8, 1992

[51] Int. Cl.$^6$ .................................................. G06F 17/00
[52] U.S. Cl. ............................ 395/50; 395/10; 395/51; 395/63
[58] Field of Search ........................ 395/50, 51, 75, 395/600, 908, 10, 63

[56] References Cited

U.S. PATENT DOCUMENTS

| | | | |
|---|---|---|---|
| 4,949,253 | 8/1990 | Chigira et al. | 395/500 |
| 5,056,021 | 10/1991 | Ausborn | 395/63 |
| 5,084,813 | 1/1992 | Ono | 395/700 |
| 5,159,687 | 10/1992 | Richburg | 395/700 |
| 5,167,010 | 11/1992 | Elm et al. | 395/50 |
| 5,253,189 | 10/1993 | Kramer | 395/10 |

FOREIGN PATENT DOCUMENTS

14584/92  6/1992  Australia ............... G06F 15/00

OTHER PUBLICATIONS

Brajnik et al, "User modeling in expert man-machine interfaces: a case study in intelligent information retrieval"; IEEE Transactions on systems, man, and cybernetics, vol. 20, No. 1, Jan./Feb. 1990.

Orman, "Rule by example: an example-based approach to knowledge base management"; Proceedings of the twenty-fifth Hawaii international conference on system sciences, pp. 377–383 vol. 3, 7–10 Jan. 1992.

Raghavan, "KNOB: a mutation-based approach for generating stereotype behaviors in active decision support systems"; Proceedings of the twenty-fourth Hawaii international conference on system sciences, pp. 417–429 vol. 3, 8–11 Jan. 1991.

*Primary Examiner*—Jack A. Lane
*Assistant Examiner*—Tarig Hafiz
*Attorney, Agent, or Firm*—Tammy L. Williams; Leo N. Heiting; Richard L. Donaldson

[57] ABSTRACT

A method (40) and system (10) are provided for knowledge based design. Conceptual model elements (12) are stored. Also, stereotype knowledge bases (14) are stored. Ones of the conceptual model elements (12) are matched with ones of the stereotype knowledge bases (14) to select a closest matching one (16) of the stereotype knowledge bases (14). Design model elements (18) are generated by applying scripts in response to the selected stereotype knowledge base (16).

20 Claims, 4 Drawing Sheets

STEREOTYPE FRAME

SLOTS

```
ENTITY MAINTENANCE SYNTHESIS
    PROCEDURE   :CLIENT ADMINISTRATION
ACTION BLOCK
    DISPLAY     :
    CREATE      :
    UPDATE      :
    DELETE      :
SCREEN IDENTIFIER
    ATTRIBUTE VIEW :
```

FIG. 6

```
┌─────────────────────────────────────────────┐
│              SYNTHESIS OPTIONS              │
├─────────────────────────────────────────────┤
│  ☒  ACTION BAR FOR COMMAND ENTRY            │
│    ┌─ UPDATE ─────────────────────────┐     │
│    │  ● ONE STAGE      ● TWO STAGE    │     │
│    └──────────────────────────────────┘     │
│    ┌─ DELETE ─────────────────────────┐     │
│    │  ● ONE STAGE      ● TWO STAGE    │     │
│    └──────────────────────────────────┘     │
│    ┌─ CREATE ─────────────────────────┐     │
│    │  ● ONE STAGE      ● TWO STAGE    │     │
│    └──────────────────────────────────┘     │
│                                             │
│    ☐ USE ENTER COMMAND FOR UPDATE           │
│    ☐ USE ENTER COMMANE FOR DISPLAY          │
│    ☐ CANCEL COMMAND - REFRESHES SCREEN FROM DATABASE │
│    ☐ CLEAR SCREEN FIELDS COMMAND            │
│                                             │
│   ( OK )   ( CANCEL )   ( HELP )            │
└─────────────────────────────────────────────┘
```

SYSTEM AND METHOD FOR THE DESIGN OF SOFTWARE SYSTEM USING A KNOWLEDGE BASE

TECHNICAL FIELD OF THE INVENTION

This invention relates in general to information engineering, and in particular to a method and system for knowledge based design.

BACKGROUND OF THE INVENTION

It is necessary in many businesses to provide rapid prototyping and development of software projects. A software development life cycle progresses from Planning, Analysis, and Design stages through to Technical Design, Construction and code Implementation. Typically, previous techniques are limited in productivity throughout such a development life cycle. In particular, the Design phase of many previous techniques is performed manually.

During design of such software, the human-to-computer interactions required to perform a business activity are defined. The interactions include transactions defined by its appearance (screen layout) and its behavior, i.e., what the transaction does, how it does it and how it relates to other transactions. The behavior is typically defined through a high level programming language such as an action diagram. Even simple conceptual design concepts may require hundreds of line of action diagram. Constructing and debugging these large action diagrams is very time intensive. A need thus exists for a technique which allows the designer to specify the behavior of a transaction with no coding involved.

Moreover, in prior development techniques, although developers naturally reuse concepts as part of design, there is no facility to reuse software in the same natural way. A design will often incorporate aspects of commonality, in order to provide a uniform interface, and will also be based on other similar successful designs. However, when the design definition is in code, it is very difficult to reuse parts of the design, especially where the code is heavily data dependent. A need has thus arisen for a technique which provides natural, object oriented mechanisms for software reuse.

Business demands the need for rapid prototyping and rapid development. Prototype designs are essential in helping the user agree with the requirements of a system, but all too often the implementation of a prototype is time consuming and code intensive.

Thus, a need has arisen for a method and system for knowledge based design, in which productivity is enhanced throughout a development life cycle. Also, a need has arisen for a method and system for knowledge based design, in which a manual design phase is replaced by an automated design process.

SUMMARY OF THE INVENTION

In a first aspect of a method and system for knowledge based design, conceptual model elements are stored. Also, stereotype knowledge bases are stored. Ones of the conceptual model elements are matched with ones of the stereotype knowledge bases to select a closest matching one of the stereotype knowledge bases. Design model elements are generated by applying scripts in response to the selected stereotype knowledge base.

In a second aspect, stereotype knowledge bases are stored, each being modifiable according to at least one associated option. One of the stereotype knowledge bases is selected in response to instruction from a user. The selected stereotype knowledge base is modified according to at least one associated option in response to instruction from the user. Design model elements are generated by applying scripts in response to the modified stereotype knowledge base.

It is a technical advantage of the present invention that productivity is enhanced throughout a development life cycle.

It is another technical advantage of the present invention that a design process is automated.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–8 of the drawings, like numerals being used for like and corresponding parts of the various drawings.

Figure 1:
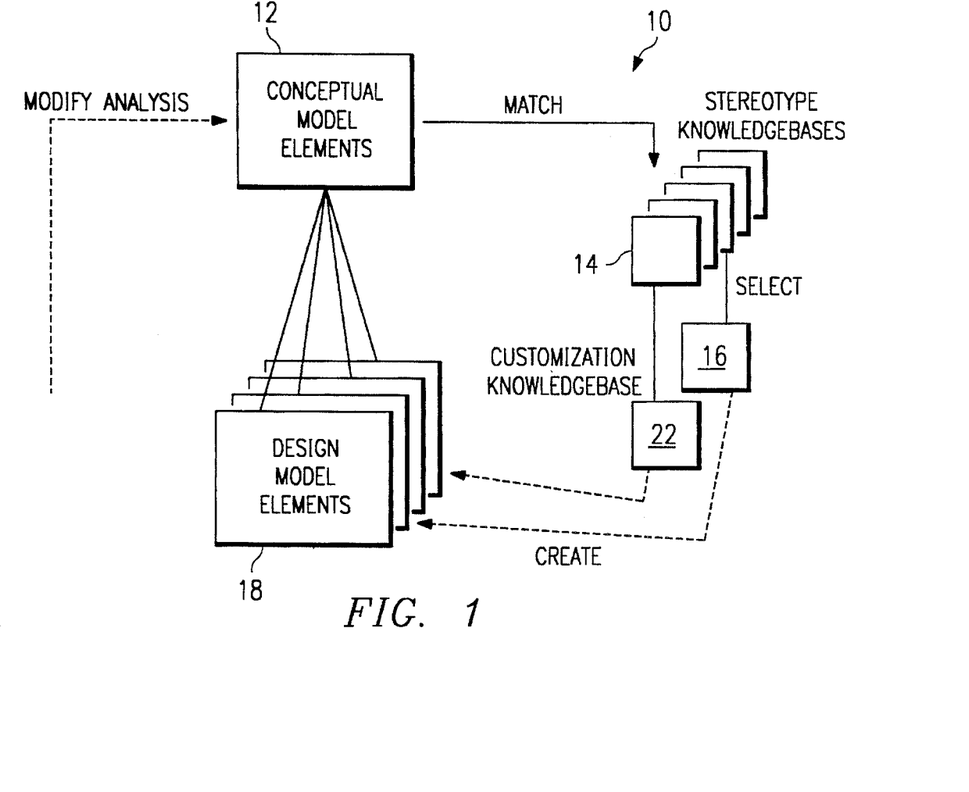
FIG. 1 illustrates a system for knowledge based design according to the preferred embodiment.

FIG. 1 illustrates a system, indicated generally at 10, for knowledge based design according to the preferred embodiment. System 10 represents an Analysis according to conceptual model elements 12. In the preferred embodiment, conceptual model elements 12 are stored in an encyclopedia database of the INFORMATION ENGINEERING FACILITY ("IEF") available from TEXAS INSTRUMENTS INCORPORATED.

System 10 automatically matches conceptual model elements 12 against stereotype knowledge bases 14. From among stereotype knowledge bases 14, system 10 selects a stereotype knowledge base 16 that best matches conceptual model elements 12. In response to selected stereotype knowledge base 16, system 10 applies scripts to create design model elements 18. In response to design model elements 18, a user 20 tests the design. Moreover, system 10 incorporates customization changes in design model elements 18 in response to instructions from user 20.

System 10 is implemented by process circuitry of a workstation 21. Accordingly, user 20 enters instructions to system 10 through a keyboard and pointing device of workstation 21. Moreover, user 20 receives information from system 10 through a display screen of workstation 21.

In a significant aspect of the preferred embodiment, system 10 supports user 20 in iteratively modifying the knowledge based design, so that system 10 selects another stereotype knowledge base 22 that best matches conceptual model elements 12 as modified by user 20. During such iteration, system 10 advantageously retains changes previously incorporated in design model elements 18 by system 10 in response to instructions from user 20. Requirements are modified as the design evolves and as feedback is received from user 20 through workstation 21. System 10 advantageously reapplies stereotype knowledge bases in response to new situations.

Significantly, system 10 improves productivity throughout a development life cycle progressing from Planning, Analysis, and Design stages through to Technical Design, Construction and code Implementation. System 10 enhances productivity by applying knowledge based design techniques, so that a manual design phase is replaced by an automated design process. System 10 creates a complete Procedure Action Diagram ("PAD") for defining a procedure in terms sufficiently complete to progress through code implementation. More particularly, system 10 implements a display screen layout, transaction behavior and inter transaction flows.

Procedure synthesis relates to an aspect of knowledge based design, in which design components are automatically generated through an object oriented interface. Using procedure synthesis, system 10 supports user 20 in selecting one of stereotype knowledge bases 14 and in tailoring the selected stereotype knowledge base by selecting different design options. The selection mechanism is design oriented, so that user 20 readily manipulates various design objects through workstation 21.

When the stereotypical design is applied, a fully functional procedure is synthesized. Advantageously, such automated procedure synthesis normally takes minutes. By comparison, a typical manual implementation of such a procedure normally takes hours. Accordingly, the knowledge based design techniques of system 10 provide a process for automatically producing high quality, first cut designs based on design rules or stereotypes.

Knowledge based design involves two aspects. In the procedure synthesis aspect, stereotypical forms are identified and automatically produced. In the rule based inferencing aspect, rules are elicited to determine which stereotypical forms are suitable in different scenarios. System 10 implements the procedure synthesis aspect separately from the rule based inferencing aspect in order to achieve significant technical advantages.

For example, system 10 supports software reuse to achieve associated gains in productivity. Software reuse can significantly improve software quality. Moreover, software reuse can reduce the amount of new code to be written for a particular application. Accordingly, these dual advantages of system 10 help reduce overall project costs. In the preferred embodiment, to support software reuse, system 10 reflects an object oriented paradigm in its structure and user interface.

System 10 supports the automation of business system design. Details of the interaction between user 20 and system 10 during procedure synthesis for business system design are discussed hereinbelow. In business system design, designers analyze a business area. In response to information compiled during such an analysis, an information system is described for satisfying the business needs. The following tasks are performed.

Task 1. System standards are established.

Task 2. Elementary processes are grouped into procedures, and the types of procedures for implementing the elementary processes are established.

Task 3. Navigations between procedures are established.

Task 4. An external user interface is established, such as display screens and reports.

Task 5. Procedure logic is established to support the system standards and options.

Task 6. Consistency and completeness of the design is verified.

To perform each of these tasks, a designer adheres to a set of rules based on experience. Some of the rules are heuristic. To successfully automate the tasks, system 10 represents the manner in which the rules determine and influence results of each task. After system 10 represents the rules, they form the basis for a knowledge base. By using rule based inferencing techniques, system 10 matches a situation against this knowledge base to perform all six tasks.

Following are examples of high level rules that apply in each of the tasks.

Example 1. System standards are established based largely on a target environment of the designed system, such as a type of target computer. Moreover, system standards are established based largely on a corporate direction. Common User Access ("CUA") is an exemplary set of standards. For example, an exemplary high level rule is IF the target environment is IBM then Follow CUA rules.

Example 2. High level rules are established. An example of a high level rule to determine the procedure type is If no interaction with the user is necessary then Implement as a batch procedure.

Example 3. Dialog is established to specify movement between display screens. Exemplary factors influencing dialog design are the frequency of the dialog's use, the user's role in the business, and the source for input to key fields, such as If knowledge of the key field is low then Provide a prompt facility.

Example 4. Display screens and reports are established. The layout of display screens and reports is also influenced by a set of rules. CUA has a comprehensive set of rules, but more heuristic rules are also available, such as If the experience of the user is high and the work pattern is constant and the number of fields is high then abbreviate prompts and compact spacing between fields.

According to the above rule, information would be densely arranged in a display screen layout, rather than being distributed across multiple display screens.

Example 5. Procedure logic is established to support different design options and system standards. For example, If confirmation is required on a delete action then add logic for two stage delete.

The execution of "add logic for two stage delete" generates appropriate action diagram logic. This logic is synthesized as part of a complete action diagram which defines the procedure in terms sufficiently complete to progress through code implementation.

Moreover, the design is reviewed for consistency. System 10 refines these high level rules into their component parts. In this manner, system 10 identifies facts for recording in an information engineering meta model, and system 10 further identifies components to be instantiated upon execution of a rule. Tasks 2 through 5 are performed for each procedure and each time a different set of rules are applied.

A stereotype references a single higher level rule representing a particular combination of lower level rules. Accordingly, each new stereotype references a different combination of rules. A stereotype combines all particular facts that result in a certain procedure step design, display screen layout and complete action diagram logic.

System 10 addresses concepts behind knowledge based design, and key components form the basis for procedure synthesis according to system 10. In the preferred embodiment, system 10 includes several tools supporting business system design. For example, a dialog flow diagramming tool supports procedure definition and dialog design. A display screen design tool supports layout design. An action diagramming tool supports procedure logic design. Advantageously, system 10 supports software re-use and enhances the design orientation of business system design.

A fundamental principle behind knowledge based design is that effective systems design is enhanced by re-using and adapting design principles that work well in analogous situations. Frequently, the differentiating factor between expert and novice designers is the number of different paradigms used by the expert to determine an improved solution for a particular situation. Certain patterns of dialog are frequently used. Accordingly, display screens often conform to standard layouts.

System 10 elicits such design expertise and represents it appropriately in stereotype knowledge bases 14. Further, system 10 allows user 20 to generate one or more of stereotype knowledge bases 14. Rules are formed so that system 10 compares a present scenario of conceptual model elements 12 against a library of stereotype knowledge bases 14. In response to the comparison, system 10 proposes design model elements 18 to address the particular situation. System 10 supports knowledge based design by storing data uniformly according to an integrated IEF meta model. Accordingly, system 10 supports reasoning and inferences from data at any stage of a life cycle.

The design rules for stereotype knowledge bases 14 are identified in response to interviews with experienced information engineering consultants. The consultants explain design rationales used on various projects. Then, implementations are reviewed.

In an iterative and successively progressive cycle, the most frequently used features in the data processing applications are identified, together with their respective levels of difficulty. Accordingly, relevant features are redefined generically rather than specifically to a particular situation. In the preferred embodiment, all design elements conform to the CUA standard. The resulting specification is represented as an annotated action diagram, including detail of flows and view matching requirements.

At a relatively early stage, a prototype system is demonstrated. As more facts accumulate in the analysis phase, system 10 adds them to the model. System 10 tailors the design to reflect changes specified by user 20. System 10 regenerates only the areas impacted by the analysis changes, so that the retransformation is non-destructive. This approach compliments the Rapid Application Development ("RAD") methodology.

Concepts are reused as part of design. For example, in a significant aspect of the preferred embodiment, system 10 reuses software. By applying stereotype knowledge bases 14 to synthesize procedures, system 10 incorporates the reusable aspects of each design into the definitions of stereotype knowledge bases 14. Accordingly, system 10 achieves software re-use by supporting information engineering through an integrated architecture. System 10 adapts a given stereotype knowledge database in response to data and processes specified during analysis.

In the preferred embodiment, system 10 is implemented by process circuitry of an EXPLORER artificial intelligence workstation. System 10 uses the KNOWLEDGE ENGINEERING ENVIRONMENT ("KEE") available from INTELLICORP to support inheritance of attributes. System 10 represents domain knowledge in the form of extensions to an information engineering meta model implemented as KEE classes. System 10 represents goal knowledge and solution knowledge in the form of stereotype rules.

Figure 2:
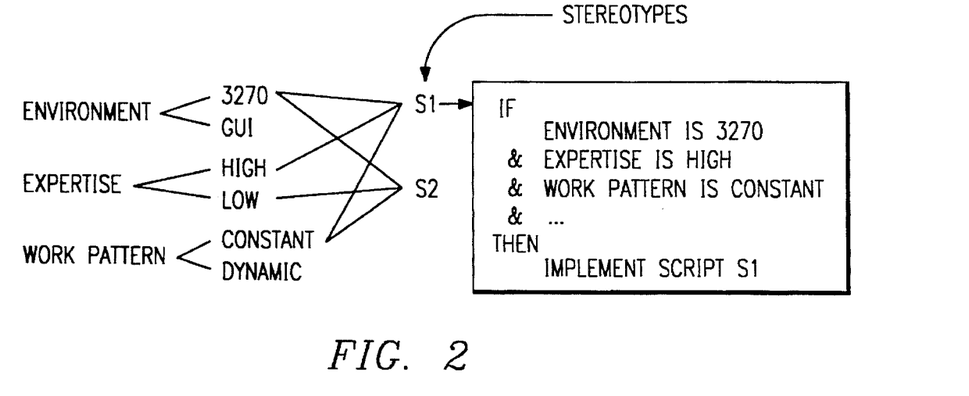
FIG. 2 illustrates an exemplary representation of a stereotype rule, according to the system of FIG. 1.

FIG. 2 illustrates an exemplary representation of a stereotype rule, according to system 10. As shown in FIG. 2, system 10 represents the stereotype rule in the form of inheritance trees. Each premise in the stereotype rule is represented as a separate fact, such as "HIGH". The stereotype rule concludes with the execution of a script, such as "S1". A new stereotype rule is represented by a unique combination of premises leading to a different implementation script, such as "S2".

Figure 3:
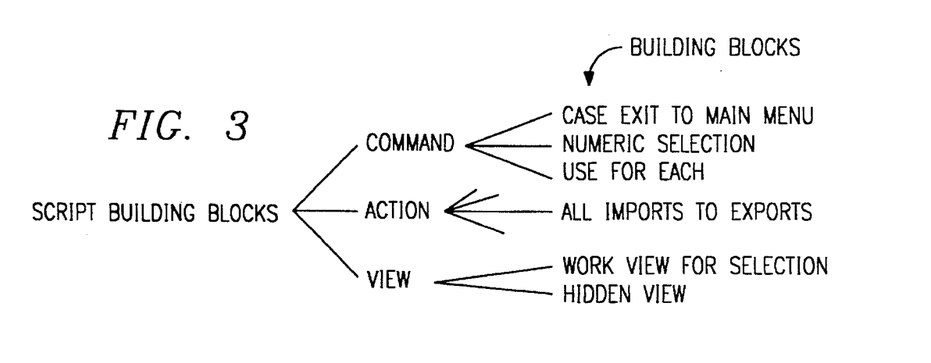
FIG. 3 illustrates exemplary script building blocks, according to the system of FIG. 1.

FIG. 3 illustrates exemplary script building blocks, according to system 10. A script is a framework for executing building blocks. Building blocks are discrete functional units having defined inputs and outputs. In the preferred embodiment, system 10 implements building blocks as KEE classes, so that a building block is useable by multiple scripts. Each building block has its own fill method defining objects to be created upon instantiation of a class.

Figure 4:
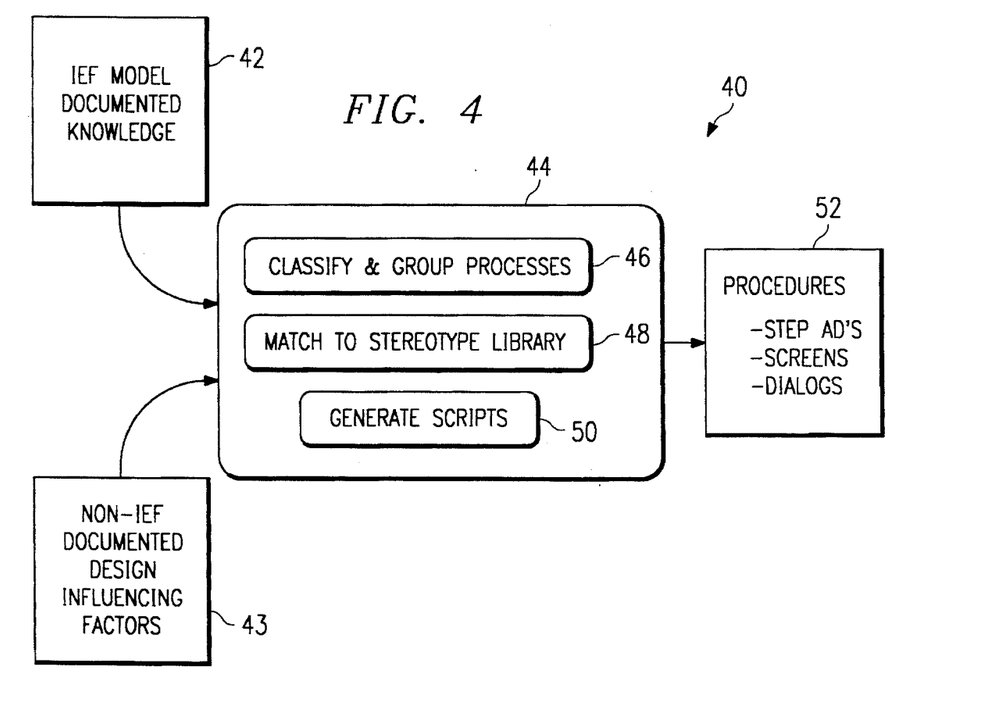
FIG. 4 is a data flow diagram of a method for knowledge based design, according to the system of FIG. 1.

FIG. 4 is a data flow diagram, indicated generally at 40, of a method for knowledge based design, according to system 10. Given suitable representations 42 and 43 for design knowledge, a knowledge based design module 44 applies the design knowledge to various situations. Knowledge based design module 44 includes a classification module 46, a matching module 48, and a generation module 50.

Figure 9:
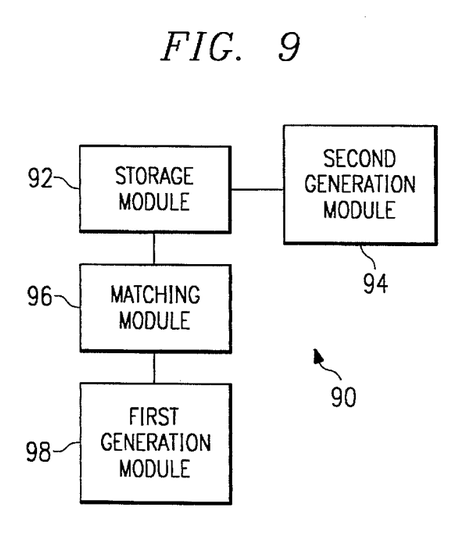
FIG. 9 shows a block diagram of one embodiment of the present invention.

FIG. 9 illustrates a block diagram of the functional blocks shown in FIG. 4. FIG. 9 shows a storage module 92 for storing a plurality of conceptual model elements based on the design and a plurality of stereotype knowledge bases based on the design. A matching module 96 for matching said conceptual model elements with the stereotype knowledge bases to select a closest match of the stereotype knowledge bases with the conceptual model elements is coupled to the storage module 92. Matching module 96 also includes a modifying module, not shown, for incorporating changes in the design model elements in response to an instruction from a user to generate modified design model elements and for modifying the conceptual model elements in response to the instruction from the user. Matching module 96 is further operable to rematch the modified conceptual model elements with the stereotype knowledge bases to select an additional closest match of the stereotype knowledge bases. Also shown in FIG. 9 is a first generation module 98 coupled to the matching module 96 for generating a plurality of design model elements by applying scripts in response to the closest match of the stereotype knowledge bases. First generation module 98 is further operable to regenerate the design model elements by applying additional scripts in response to the additional closest match of the stereotype knowledge bases, so that the changes are retained by the regenerated design model elements. Finally, FIG. 9 shows a second generation module 94 coupled to storage module 92 which is operable to generate at least one of the stereotype knowledge bases in response to instructions from a user.

Returning to FIG. 4, classification module 46 reasons about the data in the information engineering model. If appropriate, classification module 46 prompts the user for additional data. Classification module 46 classifies the information engineering processes in terms of their views and the usage of those views. In response to such a classification, classification module 46 determines whether to group a set of processes together into one procedure.

After classification, matching module 48 attempts to match a current situation against a library of stereotypes in order to select a best stereotype. If appropriate, matching module 48 prompts the user for additional data to differentiate between different stereotypes. Advantageously, matching module 48 provides defaults for data that merely determine different flavors of the same stereotype. After matching module 48 selects the best stereotype, generation module 50 generates a script associated with the selected stereotype. The script is executed to produce a design model 52 including complete step action diagrams, display screens, dialog and inter procedure flows.

Advantageously, system 10 supports an iterative cycle of analysis, design and construction phases. By comparison, previous information engineering techniques typically assume a serial approach in progressing through the project life cycle. Moreover, system 10 supports the progression from analysis through construction even where the analysis phase is incomplete. Significantly, system 10 provides suitable default values for incomplete analysis areas. Also, system 10 applies best fit rules to generate a suitable design model 52 including complete step action diagrams, display screens, dialog and inter procedure flows. Significantly, design model 52 is sufficiently complete to progress through code implementation.

Accordingly, system 10 supports iterative system-led automation, underpinned by a sophisticated rule inferencing and matching technique. The script representation of a stereotypical solution and the mechanism for executing it are in themselves significant advantages in design automation. Further, system 10 advantageously supports user selections in place of the automatic matching and selection of a stereotype, so that the design phase is significantly simpler and reduced in duration.

System 10 supports procedure synthesis for automatic generation of action diagram logic and inter procedure flows in response to the completion of a stereotypical form. By using system 10 to achieve procedure synthesis, a designer is not required to code logic in an action diagram. Instead, from a choice of stereotypes, system 10 allows the designer to select a style to be used for synthesizing the current procedure.

Relative to a typical action diagramming approach for behavior definition, system 10 supports procedure synthesis to achieve significant technical advantages in the design phase. These technical advantages are ease of use, ease of modification and software reuse.

Concerning ease of use, even basic conceptual design concepts can require hundreds of lines of action diagram for implementation. A typical action diagram does not readily support high level design concepts, and it is time consuming to implement. With system 10, the designer specifies the behavior of transactions by completing stereotypical forms, which are automatically synthesized to action diagrams so that no coding is involved.

Figure 5:
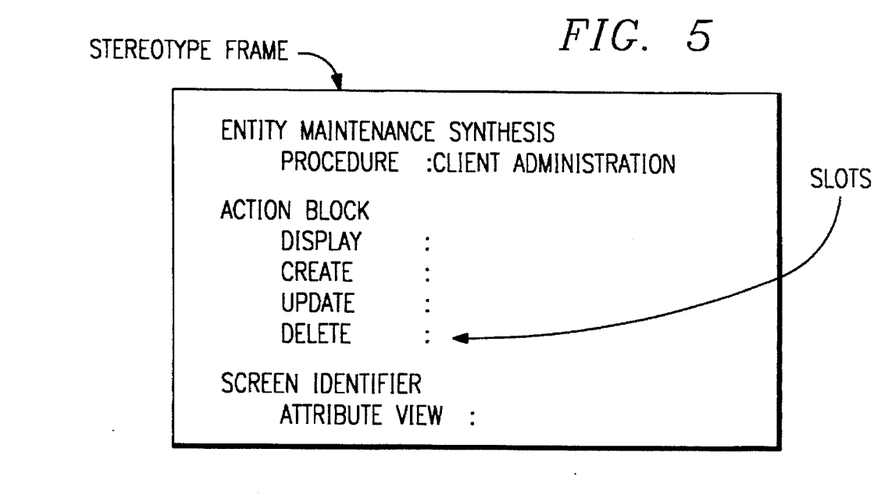
FIG. 5 illustrates an exemplary stereotype form for Entity Maintenance, according to the system of FIG. 1.

FIG. 5 illustrates an exemplary stereotype form for Entity Maintenance, according to system 10. The designer fills in each of the Slots with the data completed during analysis. After completion, system 10 supports the designer in tailoring the style of the procedure by selecting design options.

Figure 6:
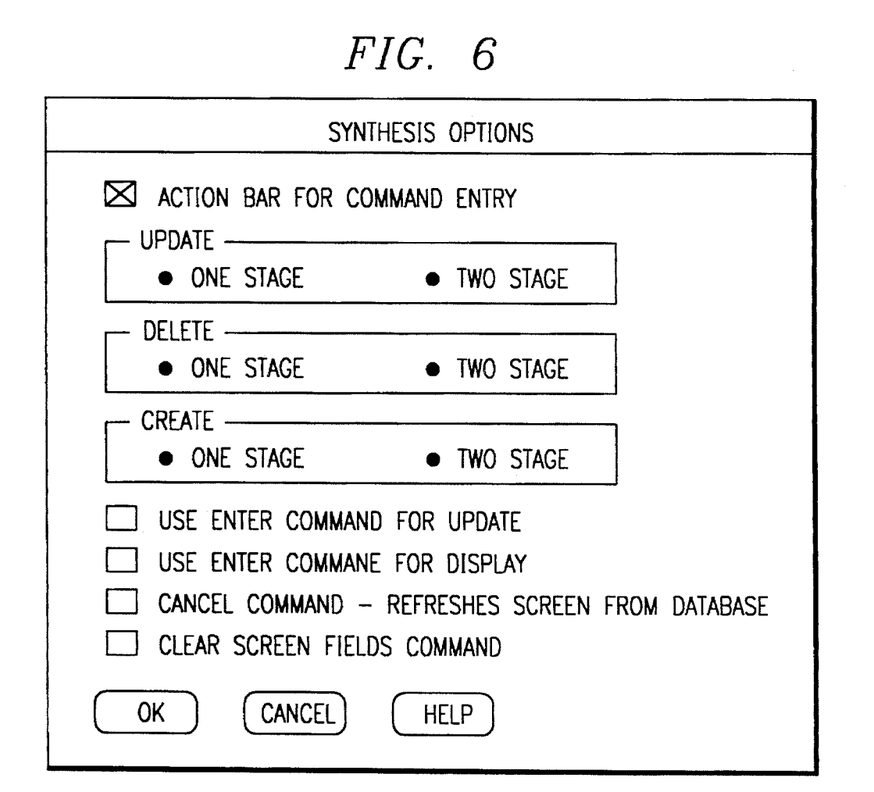
FIG. 6 illustrates an exemplary display screen of options available with a stereotype, according to the system of FIG. 1.

FIG. 6 illustrates an exemplary display screen of options available with such a stereotype, according to system 10. Concerning ease of change, if the end user decides to accommodate a different style of behavior, such a change might involve substantial editing of the action diagram. Frequently, such editing consumes more time than writing a new action diagram. Also, such editing is subject to inadvertent software programming errors. Advantageously, system 10 accommodates change and intelligently reapplies any changes since the last synthesis.

For example, if the designer finds the user requires a confirmation stage before committing a delete, then system 10 supports the designer in readily turning on the "Two stage" delete option and re-applying synthesis. In response, system 10 adds the necessary code into the action diagram without affecting the remainder of the action diagram, such that any additions and changes are preserved. Conversely, if the confirmation stage is not necessary for the application, then system 10 supports the designer in readily turning "Two stage" OFF and reapplying synthesis to remove all associated logic from the action diagram. In such a situation, system 10 removes any editing the designer might have made within the logic for two stage processing, as such editing is no longer applicable. The rest of the action diagram is unchanged.

Concerning procedure synthesis implementation according to system 10, the internal implementation also exploits the object-oriented paradigm to encapsulate the stereotype and option definitions. The stereotype is a pre-defined specimen implementation strategy for one or more business processes. It is formed by a number of slots. A design option is an implementation component reusable across stereotypes.

Figure 7:
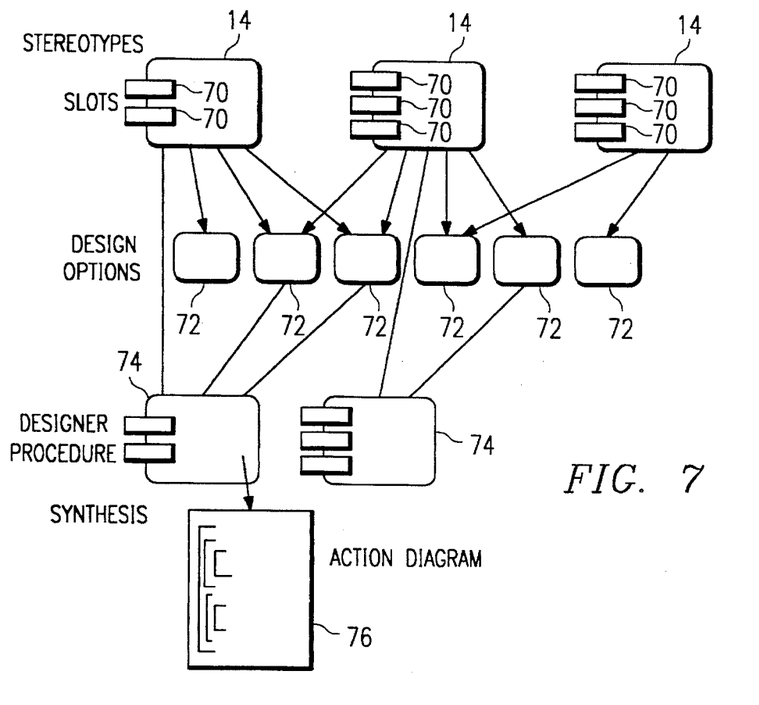
FIG. 7 illustrates mixed-in options intelligently synthesized into an action diagram by the system of FIG. 1.

FIG. 7 illustrates mixed-in options intelligently synthesized into an action diagram by system 10. Multiple stereotypes 14 having respective slots 70 are mapped to associated design options 72. Moreover, stereotypes 14 and design options 72 are mapped to one or more designer procedures 74 and intelligently synthesized by system 10 into an action diagram 76.

Figure 8:
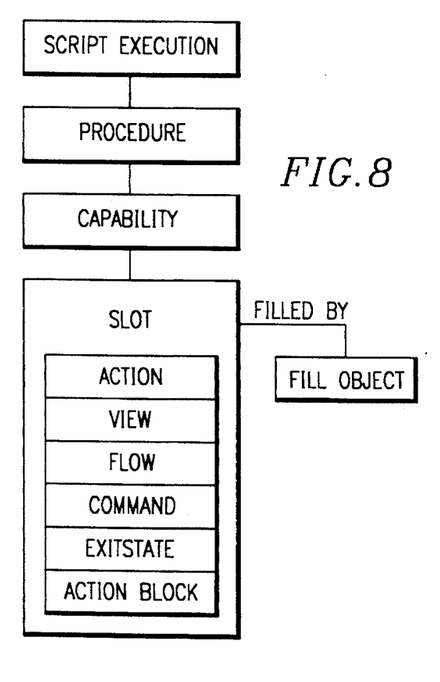
FIG. 8 illustrates relationships between script execution, procedure, design capability, slot, and "fill" object, according to the system of FIG. 1.

FIG. 8 illustrates relationships between script execution, procedure, design capability, slot, and "fill" object, according to system 10. System 10 internally represents the concepts of stereotype, design capability, and slot as C++ classes each having associated methods. Some generic behavior is coded at the class level, but each instance has its own hard coded method.

A script execution method of system 10 instantiates its related capabilities and determines if they are ON or OFF. If a capability is ON, then system 10 instantiates related slots by invoking their "fill" object routines. If a capability is OFF, then system 10 instantiates its related slots by invoking their "clear" routines. The script execution method defines the order in which slots are filled. Dependencies between slots are modelled within the script execution method.

Capabilities are groupings for slots and are also design options supported by system 10 at the user interface level. If a capability is set to OFF, then all of its associated slots are cleared; otherwise, all of its associated slots are filled. An option corresponds to a capability.

System 10 subtypes slots according to the type of objects which they create. The meta model representation by system 10 also provides a mechanism of recording which objects are created by which slots by associating the slot and the object Each slot has its own "fill" "filled" and "clear" routines or methods.

The filled method of a slot is a boolean test that normally checks if the slot has already been filled by checking whether the slot's "filled_by" relationship has been associated. All slots incorporating derived results (such as views) return false, which ensures that the fill routine is run. These slots can be classed as DERIVED slots. Slots which have fixed results can be classed STATIC.

Example results of a Derived Slot: —"SET EXPORT_MIRROR ENTITY_A ATTRIBUTE_1 TO EXPORT ENTITY_A ATTRIBUTE_1"

Example results of a Static Slot:— "EXIT STATE IS PROCESSING_STARTED".

The Clear method of a slot deletes all objects associated with that slot.

The Fill method of a slot creates the appropriate meta model objects and associations depending on its type. All Derived slots call their clear method first and then create the objects. The exception to this is view slots. All slots which result in views are written to check for the existence of the object to be created. If the object is not found, then it is created. System does not automatically delete views.

The generic behavior for each slot type is as follows.

1. View slots

| | |
|---|---|
| Filled method | Always returns false. |
| Clear method | None. |
| Fill method | Creates a high level view definition ("HFVDF") if the view to be created does not already exist. Entity and attributes to which the views belong are either input by the user, through the system 10 procedure synthesis user interface (workstation 21), or are derived from the results of another view slot. |

2. Action statement slots

| | |
|---|---|
| Filled method | Returns true if it is a static slot and the slot is filled. Returns false if it is a derived slot or the slots filled by relationships is not complete. |
| Clear method | Deletes the action statements associated to the slot via the filled_by relationship. |
| Fill method | Creates the specific action statements for this instance. |

3. Dialog flow slots

| | |
|---|---|
| Filled method | Returns true if it is a filled static slot. Dynamic slots have views matched along the flow. |
| Clear method | Deletes the dialog flow. |
| Fill method | Creates a dialog flow. The initiating and initiated procedure steps to join are input by the user or by the results of other view slots. |

4. Command slots

| | |
|---|---|
| Filled method | Returns true if the filled_by relationship is instantiated |
| Clear method | None. |
| Fill method | Creates a business system command. |

5. Exitstate slots

| | |
|---|---|
| Filled method | Returns true if the filled_by relationship is instantiated. |
| Clear method | None. |
| Fill method | Creates a business system exit state. The name of the exit state is either input by the user or derived from the result of a view slot. |

In an alternative embodiment, system 10 further supports an action block slot. Normally, there are many default Commands and Exitstates which are automatically generated whenever system 10 executes procedure synthesis. These commands are frequently used. If the commands do not exist, then they are created.

System 10 supports the user in automatically synthesizing a procedure by selecting a stereotype. The behavior of the procedure is modified by selecting different options. Procedure synthesis is a design oriented technique supported by an object oriented paradigm. Although procedure synthesis significantly improves productivity, the generated action diagram is adjustable to suit a particular site. Preferably, system 10 includes a facility for customers to define their own stereotypes.

Procedure synthesis is a task conducted during procedure definition in Design. In Design, the user uses information discovered during Analysis as the basis for describing an information system (referred to as a business system) that satisfies a business's needs. The objective of Design is to define the human-to-computer interactions required to perform the business activities defined during Analysis.

In procedure definition, the user determines what kinds of procedures are required to implement the elementary processes discovered during Analysis. A procedure defines how business activities is conducted. In essence, a procedure is the method by which one or more processes are carried out using a specific implementation technique. In a batch processing system, a procedure represents a single batch job. In an online transaction processing system, a procedure step (a subdivision of a procedure) represents a transaction conducted at a single display screen.

After deciding which processes to implement, system 10 supports the user in creating a Procedure Action Diagram ("PAD") in two ways:

- System 10 supports the user in creating the Procedure Action Diagram from scratch and manually constructing views that combine the views of all selected processes. In building process logic from scratch, the user selects each command from a menu. This method is time-consuming and gives the user little guidance, but it offers great flexibility and control.
- System 10 supports the user in conducting transformation using procedure synthesis in the Design Toolset of system 10. Transformation automatically converts an Analysis-phase object into a Design-phase object. During procedure synthesis, system 10 generates a Procedure Action Diagram ("PAD") that describes procedure logic. The Procedure Action Diagram uses the Process Action Diagrams being implemented in the procedure. System 10 also prepares a set of data views for the Procedure Action Diagram based on the combined views of all implemented processes.

The goal of procedure synthesis is to produce a PAD that is refinable by the user during procedure logic design in order to completely and accurately reflect the user's business needs.

| | |
|---|---|
| Downstream | The Construction Toolset generates program logic based on Procedure Action Diagrams. The Procedure Action Diagram uses the logic of the Process Action Diagrams for the processes implemented in the procedure. |
| | The Construction Toolset generates software that includes display screens populated with the fields initially defined with views. Code generation bases the generated program logic on the manipulation of views in Procedure Action Diagrams. |

The prerequisites for procedure synthesis are:
- Completion of elementary processes.
- Completion of the Business System Definition task.
- Definition of a business system.

Completion of the Business System Definition is the final task in Analysis. This task reveals the list of elementary processes that are necessary for the business system.

The user accesses procedure synthesis through a Dialog Design Diagramming "DLG") Tool. System 10 supports the user in accessing procedure synthesis by accessing the DLG Tool, adding a procedure, and detailing the procedure.

During business system design, the user normally considers how the generated system is to be used. For online systems, system 10 supports the user in conducting procedure synthesis to determine how to interact with display screens that present the generated software. As system 10 supports the user in conducting procedure synthesis, the following tasks are performed:
- Select the stereotype.
- Select stereotype options.
- Synthesize flows.
- Transform processes.

When the stereotype is selected, system 10 supports the user in also selecting options that influence both procedure definition and dialog design. For example, system 10 supports the user in assigning commands when the user implements action blocks. Command is a special attribute of system 10. It allows the user to specify the means for influencing procedure execution. In an online system, system 10 supports the user in placing a command field on a display screen.

At execution time, system 10 supports the user in entering a value into the command field to direct execution of the procedure. For example, a Maintain Customer procedure implements elementary processes called Add Customer, Change Customer, and Delete Customer. If the designer specifies the command to be used for execution, then system 10 supports later users in selecting among the three processes by placing the appropriate value in the command field. During procedure synthesis, system 10 supports the designer in setting the command in a Procedure Action Diagram that executes the required action block.

Building Procedure Action Diagrams primarily involves selecting and applying a stereotype. A stereotype in system 10 refers to a typical style of procedure design. In essence, a stereotype is a pre-defined implementation strategy for one or more business processes. When the user applies a stereotype, system 10 generates a stereotypical Procedure Action Diagram ("PAD"). The user selects the options that influence the design of the PAD. After the PAD is created, system 10 supports the user in refining the procedure logic to reflect the needs of the business system. Further, system 10 supports the user in repeating stereotyping. During each stereotyping iteration, system 10 advantageously preserves changes made by the user as a result of the last iteration. Alternatively, system 10 supports the user in replacing the entire PAD with code from the current iteration.

The user selects one or more of the following stereotype styles:
- Entity maintenance stereotype.
- Selection list stereotype.
- Stereotype by implementation of action blocks.

| | |
|---|---|
| Downstream | The major impact of stereotyping besides automation of implementation is reusability. This refers to reusing typical procedure definitions for any procedure. Reusability provides the following benefits: |
| | • Improves quality.<br>• Reduces overall project costs.<br>• Encourages the use of corporate standards.<br>• Encourages the commonality of user interfaces.<br>• Reduces corporate risk. |

The following discussions explain each style.

An entity maintenance stereotype synthesizes a procedure for entity maintenance actions. The user selects an action block for each of the four entity actions (CREATE, READ, UPDATE and DELETE). Normally, the user selects an action block to display (READ) records. In an online system, the user normally reads a record before UPDATEing or DELETEing it.

The user also selects a display screen identifier from the import attribute views of the process that the user selected to READ records. System 10 uses the display screen identifier as the criteria for record searches.

PADs that result from entity maintenance stereotyping contain NOTE statements that signal the user where to add custom validation logic.

A need for common logic often occurs at the end of a procedure action diagram. To accommodate such a possibfiity, error conditions found before the main CASE 0F COMMAND do not escape from the procedure. Instead, the condition sets the command to the value of BYPASS and stores the actual command. A case of BYPASS occurs in the main CASE OF COMMAND to return the command to the original value.

In addition, any ESCAPE in the main CASE OF COMMAND escapes only to the outside of the case structure. System 10 supports the user in placing any common logic at the bottom of the PAD after the CASE OF COMMAND construct.

All views that system 10 generates are set optional. In addition, system 10 generates a local work set attribute view named IEF__SUPPLIED that stores the IEF COMMAND.

A selection list stereotype allows the user to generate a PAD that presents a selection list. A selection list shows the occurrences of a subject entity type. Each display line in the list displays one or more of the attributes. The occurrences are sorted by a selected attribute. During procedure synthesis, system 10 creates a Procedure Action Diagram that describes the logic to display all occurrences of the subject entity type. System 10 also creates a field to permit the user to enter a selection. Example A-1 shows an exemplary selection list.

EXAMPLE A-1. SELECTION LIST

| LIST OF EMPLOYEES EMPLOYEE NUMBER: 0000000 | |
|---|---|
| NAME | NUMBER |
| K. AMBROSE | 0198395 |
| B. ANDREW | 1388404 |
| J. BAKER | 9873913 |
| S. BARRON | 5467938 |
| L. COLLINS | 9085940 |
| M. HANKIN | 9851098 |
| R. HARR | 2992847 |
| S. JACO | 0999800 |
| C. JOHNSON | 5986070 |
| T. MEIER | 5875619 |
| C. RINK | 0817515 |
| T. SMITH | 5888728 |
| E. STAUFFER | 1239978 |
| B. VIETTI | 7974367 |

System 10 automatically adds the CASE command to display a record. Selection list stereotypes use a Dialog Manager of system 10 for scrolling.

A stereotype based on the implementation of action blocks allows the user to generate a Procedure Action Diagram that calls any action block. System 10 supports the user in selecting action blocks for implementation from the Analysis and Design stages.

System 10 supports the use of an action blocks stereotype for procedures that do not fit the entity maintenance or selection list stereotypes, but which can still benefit from automatic view synthesis. When the user selects the action block, the user normally selects the command value that directs processing.

In preparation for transformation, system 10 supports the user in selecting options that modify the stereotype. Each modification results in annotated action statements in the PAD. The user can select the following:
• Add an action bar for command entry.
• Execute entity actions in one-stage or two-stages.
• Use the Enter command to update.
• Use the Enter command to display.
• Refresh the display screen when the command is CANCEL. • Clear data from the display screen.

System 10 supports the user in selecting all of these options for the entity maintenance stereotype, after the user selects the action block that displays records and the display screen identifier. After the user selects the subject entity type, the user can select only the first option for the selection list stereotype.

The following discussions explain these options.

ADD AN ACTION BAR FOR COMMAND ENTRY

System 10 supports the user in executing commands in three ways:
• Press a function key to which a specific command has been assigned.
• Enter a command or synonym value in the command field of system 10.
• Enter a one-character or two-character code in the general action entry field of an action bar and press a key that executes the command.

Where the user selects a selection list stereotype or an entity maintenance stereotype, system 10 responds to a user request for adding an action bar to a display screen. When the user applies the stereotype, system 10 generates a PAD that includes the logic to list commands on the action bar and provide a field for command entry. The letters D, C, and U direct the system to Display, Create and Update, respectively. Since Display and Delete both start with the letter D, system 10 supports the user in distinguishing the Delete command with the two-character entry DE.

The top of Example A-2 shows an exemplary display screen having a generated action bar.

EXAMPLE A-2. SCREEN WITH ACTION BAR FOR COMMAND ENTRY

Department Maintenance

Department:
Number                1
Name                  Personnel

System 10 generates the following statements when the user chooses to add an action bar for command entry:

```
NOTE Translate the Action Bar into a command
┌─ IF COMMAND IS EQUAL TO enter
│     AND import ief_supplied action_entry
│        IS NOT EQUAL TO SPACES
│  SET temp ief_supplied command TO display
│  ┌─ IF substr(import ief_supplied action_entry, 1,
│  │     1) IS EQUAL TO substr(temp ief_supplied
│  │        command, 1, 1)
│  │     AND (substr(import ief_supplied action_entry
│  │        2, 1) IS EQUAL TO substr(temp
│  │        ief_supplied command, 2, 1)
│  │     OR substr(import_ief_supplied action_entry, 2,
│  │        1) IS EQUAL TO SPACES)
│  └─ COMMAND IS display
│
│  SET temp ef_supplied command TO update
│  ┌─ IF substr(import ief_supplied action_entry, 1,
│  │     1) IS EQUAL TO substr(temp ief_supplied
│  │        command, 1, 1)
│  │     AND (substr(import ief_supplied
│  │        action_entry, 2, 1) IS EQUAL TO
│  │        substr(temp ief_supplied command, 2, 1)
│  │     OR substr(import ief_supplied action_entry,
│  │        2, 1) IS EQUAL TO SPACES)
│  └─ COMMAND IS update
│
│  SET temp ief_supplied command TO create
│  ┌─ IF substr(import ief_supplied action_entry, 1,
│  │     1) IS EQUAL TO substr(temp ief_supplied
│  │        command, 1, 1)
│  │     AND (substr(import ief_supplied
│  │        action_entry, 2, 1) IS EQUAL TO
│  │        substr(temp ief_supplied command, 2, 1)
│  │     OR substr(import ief_supplied action_entry,
│  │        2, 1) IS EQUAL TO SPACES)
│  └─ COMMAND IS create
│
│  SET temp ief_supplied command TO delete
│  ┌─ IF substr(import ief_supplied action_entry, 1,
│  │     1) IS EQUAL TO substr(temp ief_supplied
│  │        command, 1, 1)
│  │     AND (substr(import ief_supplied
│  │        action_entry, 2, 1) IS EQUAL TO
│  │        substr(temp ief_supplied command, 2, 1)
│  └─ COMMAND IS delete
│
│  ┌─ IF COMMAND IS EQUAL TO enter
│  │  MAKE export ief_supplied action_entry ERROR
│  │  SET temp ief_supplied command to COMMAND
│  │  COMMAND IS bypass
│  └─ EXIT STATE IS action_bar_is_invalid
└──
```

If an action bar is generated, it is not necessary to assign the same commands to PF (function) keys. Also, the Enter key is not used to display or update options.

EXECUTE ENTITY ACTIONS IN ONE-STAGE OR TWO-STAGES

In the most basic implementation of entity maintenance, system 10 executes the action immediately in response to the user issuing the command. This is known as a one-stage execution. However, to reduce the risk of unintentionally executing entity actions that affect the database, system 10 supports the generation of PAD logic having a two-stage execution:

- In the first stage, the user enters a command and system 10 returns a request for confirmation of the action.
- In the second stage, the user confirms the action, and system 10 executes the action.

During confirmation, the display screen is protected from input.

System 10 supports the user in selecting one-stage or two-stage execution individually for the CREATE, UPDATE and DELETE entity actions when the user selects an entity maintenance stereotype. Two-stage execution is most commonly used for the DELETE entity action.

The following example shows the action diagram statements that system 10 generates for a two-stage deletion.

```
.
.
.
NOTE two-stage processing requires resetting the
     LAST COMMAND field so that it lasts one pass.
─ IF COMMAND IS NOT EQUAL TO confirm
   SET export_last ief_supplied command to SPACES .
NOTE Validation CASE OF COMMAND
─ CASE OF COMMAND
─ CASE delete
  NOTE Add specific DELETE validation here. If an
       error is found, an EXIT STATE should be set.
   ─ IF EXIT STATE IS NOT EQUAL TO processing_ok
      SET temp ief_supplied command TO COMMAND
      COMMAND IS bypass
   ─ ELSE
      EXIT STATE IS valid_delete
      SET export_last_2 ief_supplied command
         TO COMMAND
      COMMAND IS protect ─ CASE confirm
  NOTE Set command to LAST COMMAND.
     IF import_last ief_supplied command
         IS EQUAL TO update
       OR import_last ief_supplied command IS EQUAL TO
create
       OR import_last ief_supplied command IS EQUAL TO
delete
       COMMAND IS export_last ief_supplied command SET export_last ief_supplied command to SPACES NOTE Main CASE OF COMMAND
─ CASE OF COMMAND
.
.
.
─ CASE protect
  NOTE All fields are protected after successful
       validation.
  COMMAND IS export_last_2 ief_supplied command
  MAKE export customer name Protected Normal
       Intensity Normal Color
  MAKE export customer number Protected Normal
       Intensity Normal Color
  MAKE export customer address Protected Normal
       Intensity Normal Color
  MAKE export customer city Protected Normal
       Intensity Normal Color
  MAKE export customer state Protected Normal
       Intensity Normal Color
  MAKE export customer zip Protected Normal
       Intensity Normal Color
  MAKE export_hidden_id customer number Protected
       Normal Intensity Normal Color
  MAKE export_last ief_supplied command Protected
       Normal Intensity Normal Color
  MAKE export_last_2 ief_supplied command Protected
       Normal Intensity Normal Color
.
.
```

USE THE ENTER COMMAND TO UPDATE

System 10 supports the generation of action diagram logic that executes commands based on the contents of display screen fields. System 10 supports the user in specifying that the display screen update the data in response to pressing the Enter key after changing the data in any field, except in the display screen identifier field(s). This assumes that the Enter key is assigned a command of ENTER.

The following example shows the logic if later users are to press Enter for updating the data:

```
NOTE The ENTER command is used to request an UPDATE.
     Convert ENTER to UPDATE if the key has not changed.
─ IF COMMAND IS EQUAL TO enter
     AND import customer number IS NOT EQUAL TO
         import_hidden_id customer number
     COMMAND IS display
```

USE THE ENTER COMMAND TO DISPLAY

System 10 supports the user in specifying, in response to a later user pressing the Enter key after changing the data in the display screen identifier field, that a new screen display the selection identified by the display screen identifier field. This assumes that the Enter key is assigned a command of ENTER.

The following example shows the logic if the later user is to press Enter to display the next selection:

```
NOTE The ENTER command is used to request a DISPLAY
     of the next selection. Convert ENTER to
     DISPLAY if the key has changed.
─ IF COMMAND IS EQUAL TO enter
     AND import customer number IS NOT EQUAL TO
         import_hidden_id customer number
     COMMAND IS display
```

REFRESH THE DISPLAY SCREEN WHEN THE COMMAND IS CANCEL

The user can specify to system 10 that, in response to the CANCEL command being requested, the synthesized system refresh the display screen from the database. The data that refreshes the display screen is based on the display screen identifier from the previous display.

The following example shows the logic for the CANCEL command:

```
NOTE If command is CANCEL and the hidden identifier
     is blank, escape before moving Imports to
     Exports so that the display screen is blanked out.
  ┌─ IF COMMAND IS EQUAL TO cancel
  │     AND (import customer number IS EQUAL TO 0
  │     EXIT STATE IS processing_ok
  ←┤─────── ESCAPE
  └

NOTE: Main CASE OF COMMAND
  ┌─ CASE OF COMMAND
  │    .
  │    .
  │    .
  ├── CASE cancel
  │     NOTE Passes the hidden identifier rather than the
  │          import identifier when the display module
  │          is called.
  │     USE dis_customer
  │         WHICH IMPORTS: Entity View import_hidden_id
  │                        customer
  │         WHICH EXPORTS: Entity View export customer
  │    .
  │    .
  │    .
```

System 10 also creates a CASE CANCEL that USEs the action block that displays the data.

CLEAR DATA FROM THE DISPLAY SCREEN

The designer can specify to system 10 that a command be selectable for clearing data from all display screen fields.

The following example shows the logic if a later user is to enter a command to clear the display screen:

```
NOTE If command is CLEAR, escape before moving
     Imports to Exports so that the display screen is
     blanked out.
  ┌─ IF COMMAND IS EQUAL TO clear
  │     EXIT STATE IS processing_ok
  ←┤─────── ESCAPE
  └
```

A flow refers to the movement of control and, optionally, of data between procedure steps. System 10 supports the user in creating special flows between the procedure to be generated and other procedures.

Synthesize flows includes the following tasks:
- Synthesize menu flows
- Synthesize subject list flows
- Synthesize neighbor selection list flows The following discussions explain each task.

SYNTHESIZE MENU FLOWS

In an online system, system 10 displays a menu to support the user's navigation between procedures in the current business system or in another business system. System 10 supports the user in creating flows between procedure steps so that one procedure step serves as a menu to another.

System 10 creates a link flow and a transfer flow. The CASE statements that execute the link are built when the link flow is created. Each link occurs through an EXIT STATE IS link_to_procedure_name statement, where procedure_name refers to the name of the destination procedure step.

The transfer to a menu procedure step is created to manage the following situations:
- When a procedure step is displayed from a clear display screen
- When there is a flow from another procedure step System 10 also supports the user in mapping views to ensure that the correct data flows. EXAMPLE A-3 shows an example of a basic menu.

EXAMPLE A-3. MENU

MENU
1 = EMPLOYEES
2 = DEPARTMENTS
Enter Selection:

System 10 supports the user in adding menu flows to any procedure steps that are to be connected to other procedure steps.

SYNTHESIZE SUBJECT LIST FLOWS

System 10 supports subject list flow synthesis to allow the user to add a flow between a synthesized selection list procedure step and the current procedure step. The selection list procedure step has the same subject entity as the entity maintenance procedure. The user also selects the command that executes the flow.

The selection list to which the user connects the flow is useful as a menu of the subject entity type for the procedure step being detailed. For example, system 10 supports the user in synthesizing a flow between a selection list procedure step that lists employees and an entity maintenance procedure step that performs entity actions on employee personnel records. The subject entity is selectable from the selection list, and entity maintenance actions are performable on the subject entity. At the completion of entity maintenance, system 10 returns to the selection list.

System 10 automatically creates a transfer and a link. A link flows from the selection list procedure step to the entity maintenance procedure step. A command of DISPLAY invokes the Executive First option. The entity maintenance procedure step returns from the link on a command of RETURN and passes no command with the Execute First option. System 10 matches the current subject view in the entity maintenance procedure step back on the return, so that the selection list procedure step starts from the current selection.

A transfer flows from the entity maintenance procedure step to the selection list procedure step. A command of DISPLAY invokes the Execute Fist option at the selection list. Since no data is matched, the selection list is displayed from the beginning.

SYNTHESIZE NEIGHBOR SELECTION LIST FLOWS

System 10 supports neighbor selection list flows synthesis to support the user in adding a flow from a current procedure step to a selection list procedure step. The selection list procedure step has any subject entity type, including that of the current procedure step. The flow is implemented as a link. The designer selects the command that executes the flow.

The intent of the neighbor selection list flow is to allow the user to complete an action at one display screen (including an entity maintenance display screen) by selecting an occurrence from a selection list. The occurrence of the selected neighboring entity type should have an attribute that appears in the view set. For example, the user might want to complete a name at an entity maintenance display screen. By adding a flow to a neighbor selection list, the user can select the name from the list to complete the field on the entity maintenance display screen.

The user selects the neighboring entity type from the current procedure step's import views. A command of DISPLAY passes down the flow with the Execute First option. No data is matched on the flow. The flow returns to the current procedure step on a command of RETURN. The flow passes no command with the Display First option. On return from the neighbor procedure, the data maps to the selected entity view.

System 10 automatically transforms elementary processes and stereotype options into a procedure. The designer readily selects and applies a stereotype. After completion of transformation, system 10 supports the designer in refining the action diagram for the procedure step using the PAD Tool. System 10 supports the designer in reviewing the interconnections between action blocks using the structure Charting Tool. Finally, system 10 supports the designer in generating the display screen in the SD Tool by selecting the Auto Layout action.

Although the present invention and its advantages have been described in detail, it shotfid be understood that various changes, substitutions and alterations can be made therein without departing from the spirit and scope of the invention as defined by the appended claims.

What is claimed is:

1. A system for knowledge based design to facilitate the design of objects, comprising:

storage means for storing a plurality of conceptual model elements based on the design and a plurality of stereotype knowledge bases based on the design;

matching means coupled to said storage means for matching said conceptual model elements with said stereotype knowledge bases to select a closest match of said stereotype knowledge bases with said conceptual model elements;

modifying means included in said matching means for incorporating changes in said design model elements in response to an instruction from a user to generate modified design model elements and for modifying said conceptual model elements in response to said instruction from said user;

said matching means further operable to rematch said modified conceptual model elements with said stereotype knowledge bases to select an additional closest match of said stereotype knowledge bases;

first generating means coupled to said matching means for generating a plurality of design model elements by applying scripts in response to said closest match of said stereotype knowledge bases; and said first generating means further operable to regenerate said design model elements by applying additional scripts in response to said additional closest match of said stereotype knowledge bases, so that said changes are retained by said regenerated design model elements.

2. The system of claim 1, wherein the system further comprises second generating means coupled to said storage means for generating at least one of said stereotype knowledge bases in response to an instruction from a user.

3. The system of claim 1, wherein each of said scripts forms a part of an associated stereotype rule.

4. The system of claim 1, wherein said conceptual model elements represent an analysis stage of a development life cycle.

5. The system of claim 1, wherein said design model elements comprise at least one procedure action diagram.

6. A system for knowledge based design to facilitate the design of an object, comprising:

storage means for storing a plurality of stereotype knowledge bases based on the design, each of said stereotype knowledge bases being modifiable according to at least one associated option;

modifying means coupled to said storage means for selecting one of said stereotype knowledge bases based on the design in response to an instruction from a user;

said modifying means further including means for modifying said one of said stereotype knowledge bases according to said at least one associated option in response to said instruction from the user;

first generating means coupled to said modifying means for generating a plurality of design model elements by applying scripts in response to said modified one of said stereotype knowledge bases;

said modifying means further operable to incorporate changes in said design model elements in response to said instruction from said user and to select another of said stereotype knowledge bases in response to an additional instruction from said user; and said first generating means further operable to regenerate said design model elements by applying additional scripts in response to said another of said stereotype knowledge bases so that said changes are retained by said regenerated design model elements.

7. The system of claim 6, wherein said modifying means is operable to further modify said modified one of said stereotype knowledge bases according to said at least one associated option in response to said instruction from said user; and said first generating means is further operable to regenerate said design model elements by applying additional scripts in response to said further modified one of said stereotype knowledge bases so that said changes are retained by said regenerated design model elements.

8. The system of claim 6, wherein said system further comprises second generating means coupled to said storage means for generating at least one of said stereotype knowledge bases in response to said instruction from said user.

9. The system of claim 6 wherein each of said scripts forms a part of an associated stereotype rule.

10. The system of claim 10, wherein said design model elements comprise at least one procedure action diagram.

11. A method of knowledge based design to facilitate the design of an object, comprising the steps of:

storing a plurality of conceptual model elements and a plurality of stereotype knowledge bases;

matching said conceptual model elements with said stereotype knowledge bases to select a closest match of said stereotype knowledge bases with said conceptual model elements;

generating a plurality of design model elements by applying scripts in response to said closest match of said stereotype knowledge bases;

incorporating changes in said design model elements in response to an instruction from a user;

modifying said conceptual model elements in response to an instruction from the user;

rematching said conceptual model elements with said stereotype knowledge bases to select another closest match of said stereotype knowledge bases; and regenerating said design model elements by applying additional scripts in response to said another closest match of said stereotype knowledge bases, so that said changes are retained by said modified design model elements.

12. The method of claim 11, wherein the method further comprises the step of generating at least one of said stereotype knowledge bases in response to said instruction from said user.

13. The method of claim 11, wherein the method further comprises the step of forming each of said scripts from a portion of an associated stereotype rule.

14. The method of claim 11, wherein the method further comprises the step of representing said conceptual model elements with an analysis stage of a development life cycle.

15. The method of claim 11, wherein the method further comprises the step of generating at least one procedure action diagram from said design model elements.

16. A method of knowledge based design, comprising the steps of:

storing a plurality of stereotype knowledge bases based on a design, each of said stereotype knowledge bases being modifiable according to at least one associated option;

selecting one of said stereotype knowledge bases in response to an instruction from a user;

modifying said one of said stereotype knowledge bases according to said at least one associated option in response to said instruction from said user;

generating a plurality of design model elements by applying scripts in response to said modified one of said stereotype knowledge bases;

incorporating changes in said design model elements in response to said instruction from said user;

selecting another of said stereotype knowledge bases in response to an additional instruction from said user; and modifying said design model elements by applying additional scripts in response to said another of said stereotype knowledge bases so that said changes are retained by said modified design model elements.

17. The method of claim 16, wherein the method further comprises the step of generating at least one of said stereotype knowledge bases in response to said instruction from said user.

18. The method of claim 16, wherein the method further comprises the step of forming each of said scripts from a part of an associated stereotype rule.

19. The method of claim 16, wherein said method further comprises the step of generating at least one procedure action diagram from said design model elements.

20. A method of knowledge based design, comprising the steps of:

storing a plurality of stereotype knowledge bases based on a design, each of said stereotype knowledge bases being modifiable according to at least one associated option;

selecting one of said stereotype knowledge bases in response to an instruction from a user;

modifying said one of said stereotype knowledge bases according to said at least one associated option in response to said instruction from said user;

generating a plurality of design model elements by applying scripts in response to said modified one of said stereotype knowledge bases;

incorporating changes in said design model elements in response to said instruction from said user;

further modifying said modified one of said stereotype knowledge bases according to said at least one associated option in response to said instruction from the user; and regenerating said design model elements by applying scripts in response to said further modified one of said selected stereotype knowledge bases so that said changes are retained by said modified design model elements.

* * * * *

UNITED STATES PATENT AND TRADEMARK OFFICE
CERTIFICATE OF CORRECTION

PATENT NO.   :   5,539,862

DATED        :   Jul. 23, 1996

INVENTOR(S)  :   Keith W. Short; Josephine O'Dwyer; and James R. Abbott

It is certified that error appears in the above-indentified patent and that said Letters Patent is hereby corrected as shown below:

Column 20, line 47, Claim 10 should reference Claim 6.

Signed and Sealed this

Third Day of December, 1996

Attest:

BRUCE LEHMAN

*Attesting Officer*          *Commissioner of Patents and Trademarks*